US010349645B2

United States Patent
Kitajima et al.

(10) Patent No.: US 10,349,645 B2
(45) Date of Patent: Jul. 16, 2019

(54) SINGLE-BEARING REEL

(71) Applicants: Shimano Inc., Sakai, Osaka (JP);
Shimano Components (Malaysia) SDN. BHD., Pontian, Johor (MY)

(72) Inventors: Keigo Kitajima, Sakai (JP); Chun Wee Chew, Johor (MY); Muhamad Aidil Bin Misseri, Johor (MY); Wen Yin Lee, Johor (MY)

(73) Assignees: SHIMANO INC., Sakai, Osaka (JP); SHIMANO COMPONENTS (MALAYSIA) SDN, BHD., Pontian, Johor (MY)

( * ) Notice: Subject to any disclaimer, the term of this patent is extended or adjusted under 35 U.S.C. 154(b) by 267 days.

(21) Appl. No.: 15/495,553

(22) Filed: Apr. 24, 2017

(65) Prior Publication Data

US 2017/0347636 A1    Dec. 7, 2017

(30) Foreign Application Priority Data

Jun. 1, 2016    (JP) .................................. 2016-110466

(51) Int. Cl.
*A01K 89/01* (2006.01)
*A01K 89/015* (2006.01)
(Continued)

(52) U.S. Cl.
CPC ...... *A01K 89/01928* (2015.05); *A01K 89/016* (2013.01); *A01K 89/0187* (2015.05); *A01K 89/01931* (2015.05); *A01K 89/033* (2013.01)

(58) Field of Classification Search
CPC ............ A01K 89/016; A01K 89/01908; A01K 89/01928; A01K 89/0193; A01K 89/01931; A01K 89/05; A01K 89/059
See application file for complete search history.

(56) References Cited

U.S. PATENT DOCUMENTS 3,958,771 A    5/1976 Everett et al.
3,989,204 A *  11/1976 Lemery ................ A01K 89/016
                                                        242/295
(Continued)

FOREIGN PATENT DOCUMENTS

JP    2002218881 A    8/2002
KR    100809444 B1 *  3/2008 ........... A01K 89/058

OTHER PUBLICATIONS

Extended European Search Report dated Oct. 27, 2017 for corresponding EP Application No. 17171630.1, 16 pp.

*Primary Examiner* — Emmanuel M Marcelo
(74) *Attorney, Agent, or Firm* — United IP Counselors, LLC (57) ABSTRACT

A single-bearing reel includes a reel unit, a spool shaft, a support unit, a spool, a first restriction member, a second restriction member, a pair of first seal members, a second seal member, and a third seal member. The pair of first seal members is disposed on an outer peripheral surface of the support unit. One of the pair of first seal members seals between the support unit and the first restriction member. The other of the pair of first seal members seals between the support unit and the second restriction member. The second seal member seals an inner peripheral part of the support unit from an inner peripheral part of the first restriction member. A third seal member seals the inner peripheral part of the support unit from an inner peripheral part of the second restriction member.

16 Claims, 9 Drawing Sheets

(51) Int. Cl.
*A01K 89/016* (2006.01)
*A01K 89/033* (2006.01)

(56) References Cited

U.S. PATENT DOCUMENTS

| | | | | |
|---|---|---|---|---|
| 4,657,201 A * | 4/1987 | Munroe | ............... | A01K 89/016 242/265 |
| 6,073,871 A * | 6/2000 | Farris | .................... | A01K 87/06 242/295 |
| 6,286,772 B1 * | 9/2001 | Koelewyn | ............ | A01K 89/016 242/246 |
| 6,354,526 B1 * | 3/2002 | Morise | ............... | A01K 89/0111 242/295 |
| 8,480,022 B2 * | 7/2013 | Kang | ................... | A01K 89/016 242/318 |
| 2001/0038053 A1 * | 11/2001 | Vashro | ................ | A01K 89/016 242/295 |
| 2009/0090802 A1 * | 4/2009 | Chivarov | ............. | A01K 89/046 242/303 |
| 2012/0055070 A1 * | 3/2012 | Maerz | ................. | A01K 89/016 43/22 |
| 2015/0136890 A1 | 5/2015 | Koelewyn | | |

* cited by examiner

SINGLE-BEARING REEL

CROSS-REFERENCE TO RELATED APPLICATIONS

This application claims priority to Japanese Patent Application No. 2016-110466 filed on Jun. 1, 2016, the entirety of which is hereby incorporated by reference in its entirety.

BACKGROUND

Technical Field

The present disclosure relates to a single-bearing reel.

Background Information

Single-bearing reels are widely used for fly fishing and so forth. For example, a single-bearing reel described in Japan Laid-open Patent Application Publication No. 2002-218881 includes a reel unit, a spool shaft, a spool and a drag mechanism. The spool shaft is supported as a cantilever by the reel unit. The spool is rotatably mounted to the spool shaft through a bearing. Additionally, the spool is provided with a large number of through holes so as to achieve a reduction in the weight of the spool and an enhancement in the aesthetic appearance of the reel unit.

As described above, in the single-bearing reel, the bearing and the drag mechanism are mounted to the interior of the center part of the spool (i.e., in the surroundings of the spool shaft). When water, a foreign object and/or so forth intrude into the interior of the center part of the spool, this can result in degradation in rotational performance of the spool and/or reduction in a braking force of the drag mechanism. Moreover, such intrusion can result in corrosion of members in the surroundings of the spool shaft and/or members composing the drag mechanism.

BRIEF SUMMARY

It is an object of the present disclosure, in a single-bearing reel, to block intrusion of water and/or so forth into the surroundings of a spool shaft so as to enhance durability of the single-bearing reel and simultaneously inhibit degradation in rotational performance of a spool. It is another object of the present disclosure, in a single-bearing reel including a drag mechanism, to inhibit reduction in a braking force of the drag mechanism.

(1) A single-bearing reel according to an aspect of the present disclosure includes a reel unit, a spool shaft, a support unit having a tubular shape, a spool, a first restriction member having an annular shape, a second restriction member having an annular shape, a pair of first seal members, a second seal member and a third seal member. The reel unit includes a shaft support part. The spool shaft is supported as a cantilever by the shaft support part. The support unit is rotatable with respect to the spool shaft. The spool is mounted to the support unit. The spool is rotatable with respect to the spool shaft. A fishing line can be wound about an outer periphery of the spool. The first restriction member enables the spool shaft to penetrate through the first restriction member. The first restriction member is at least partially mounted to an outer peripheral part of the support unit on one end side of the support unit. The first restriction member restricts the spool from moving in an axial direction. The second restriction member enables the spool shaft to penetrate through the second restriction member. The second restriction member is at least partially mounted to the outer peripheral part of the support unit on the other end side of the support unit. The second restriction member restricts the spool from moving in the axial direction. The pair of first seal members is disposed on an outer peripheral surface of the support unit. One of the pair of first seal members seals between the support unit and the first restriction member, whereas the other of the pair of first seal members seals between the support unit and the second restriction member. The second seal member blocks intrusion of water into an inner peripheral part of the support unit from an inner peripheral part of the first restriction member. The third seal member blocks intrusion of the water into the inner peripheral part of the support unit from an inner peripheral part of the second restriction member.

In the present single-bearing reel, the first to third seal members are disposed between the support unit and the other members. Therefore, it is possible to block intrusion of water into the surroundings of the spool shaft in the inner peripheral part of the support unit. Hence, it is possible to enhance durability of the reel, and simultaneously, inhibit degradation in rotational performance of the spool.

(2) The single-bearing reel can further include a drag mechanism. The drag mechanism includes a drag knob for adjusting a drag force. The drag knob is disposed on an inner peripheral side of the second restriction member. Additionally, the third seal member can seal between the inner peripheral part of the second restriction member and an outer peripheral part of the drag knob.

In this construction, it is possible to block intrusion of water into the surroundings of the drag mechanism. Hence, it is possible not only to achieve advantageous effects similar to those described above but also to inhibit reduction in a braking force of the drag mechanism.

(3) A single-bearing reel according to another aspect of the present disclosure includes a reel unit, a spool shaft, a support unit having a tubular shape, a spool, a drag shaft, a first restriction member having an annular shape, a second restriction member having a closed-end cylindrical shape, a pair of first seal members, a second seal member and a third seal member. The reel unit includes a shaft support part. The spool shaft is supported as a cantilever by the shaft support part. The support unit is rotatable with respect to the spool shaft. The spool is mounted to the support unit. The spool is rotatable with respect to the spool shaft. A fishing line can be wound about an outer periphery of the spool. The drag shaft is disposed to penetrate an interior of the shaft support part and an interior of the spool shaft. The first restriction member enables the spool shaft to penetrate through the first restriction member. The first restriction member is at least partially mounted to an outer peripheral part of the support unit on one end side of the support unit. The first restriction member restricts the spool from moving in an axial direction. The second restriction member is at least partially mounted to the outer peripheral part of the support unit on the other end side of the support unit. The second restriction member restricts the spool from moving in the axial direction. The pair of first seal members is disposed on an outer peripheral surface of the support unit. One of the pair of first seal members seals between the support unit and the first restriction member, whereas the other of the pair of first seal members seals between the support unit and the second restriction member. The second seal member blocks intrusion of water into an inner peripheral part of the support unit from an inner peripheral part of the first restriction member.

The third seal member seals between an inner peripheral part of the spool shaft and an outer peripheral part of the drag shaft.

The present single-bearing reel is provided with the first to third seal members, whereby it is possible to block intrusion of sea water and/or so forth into the spool shaft and the surroundings of the drag mechanism. Hence, it is possible to enhance durability of the reel, and simultaneously, inhibit degradation in rotational performance of the spool and reduction in a braking force of the drag mechanism.

(4) The second seal member can seal between the inner peripheral part of the first restriction member and an outer peripheral part of the shaft support part.

(5) The spool can include a boss having a tubular shape. The support unit can be inserted into an interior of the boss. The boss can be interposed between the first restriction member and the second restriction member and can be restricted from moving in the axial direction.

(6) The pair of first seal members can be a pair of O-rings.

(7) The support unit can include a pair of bearings and a roller clutch. The pair of bearings supports the spool shaft. The roller clutch is disposed between the pair of bearings, and transmits or blocks rotation of the spool in accordance with a rotational direction of the spool.

In this construction, it is possible to block intrusion of water into a part in which the pair of bearings and the roller clutch are disposed. Hence, it is possible to enhance durability of the reel, and simultaneously, inhibit degradation in rotational performance of the spool.

Overall, according to the present disclosure, it is possible to block intrusion of water and/or so forth into the surroundings of the spool shaft in the single-bearing reel. Hence, it is possible to enhance durability of the single-bearing reel, and simultaneously, inhibit degradation in rotational performance of the spool. Additionally, when the single-bearing reel is designed to include the drag mechanism, it is possible to inhibit reduction in a braking force of the drag mechanism.

BRIEF DESCRIPTION OF THE DRAWINGS

Referring now to the attached drawings which form a part of this original disclosure.

DETAILED DESCRIPTION OF EMBODIMENTS

First Preferred Embodiment

Figure 1:
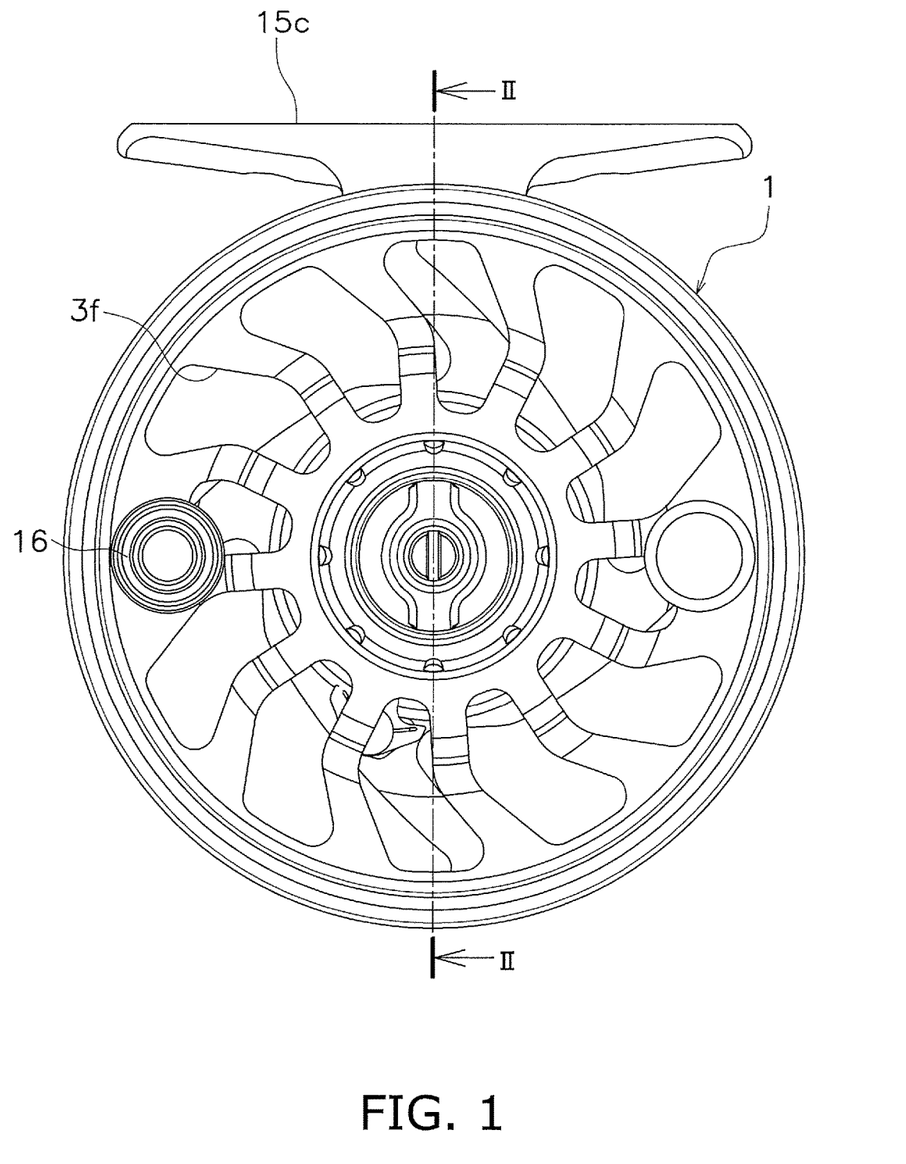
FIG. 1 is a side view of a single-bearing reel according to a first preferred embodiment of the present disclosure.
Figure 2:
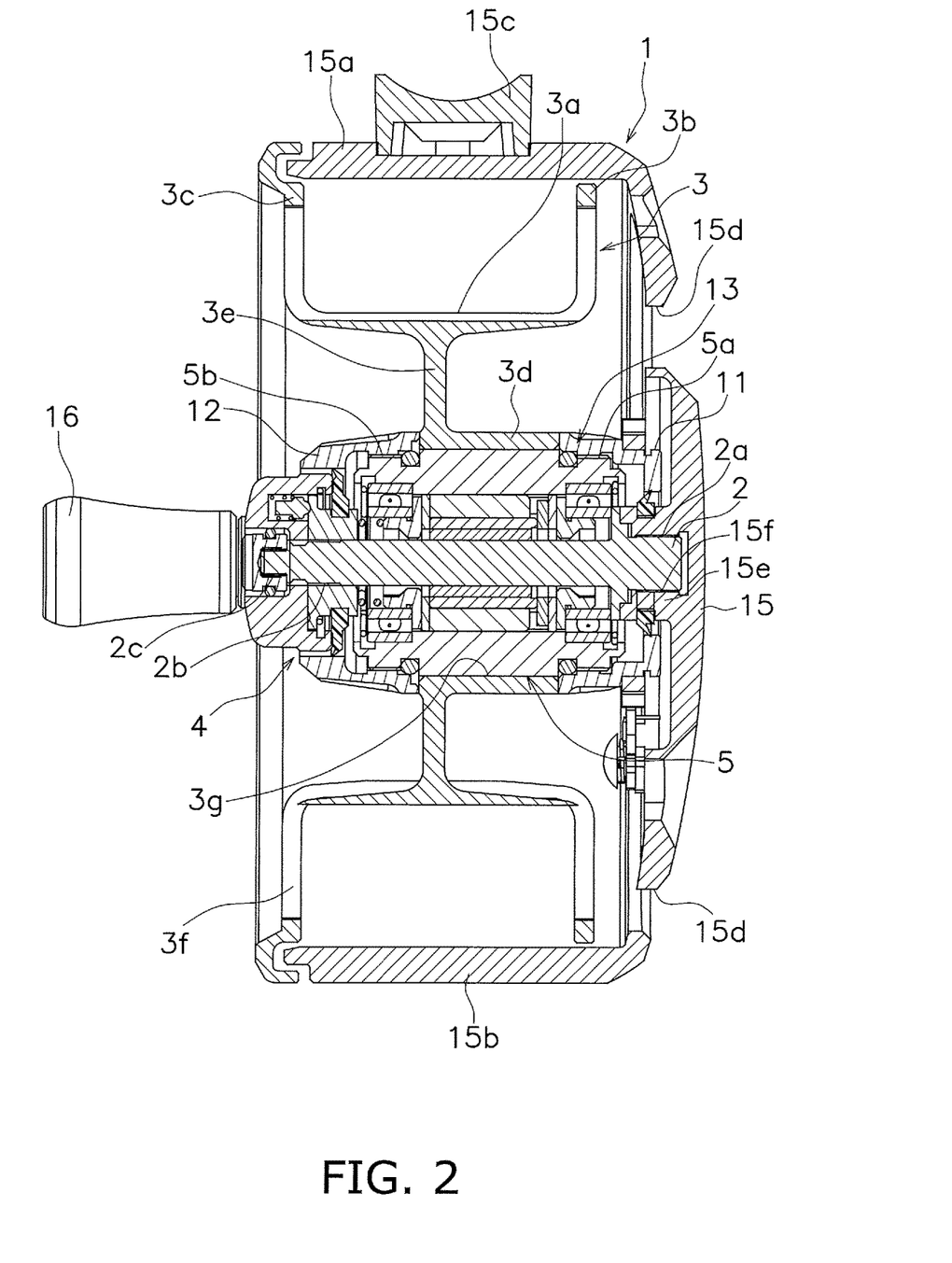
FIG. 2 is a cross-sectional view of the single-bearing reel shown in FIG. 1 taken along line II-II.

FIGS. 1 and 2 are a side view and a cross-sectional view of a single-bearing reel employing a first preferred embodiment of the present disclosure, respectively. It should be noted that in the following explanation, the term "first side" refers to the right side in FIG. 2 whereas the term "second side" refers to the left side in FIG. 2.

The present single-bearing reel includes a reel unit 1, a spool shaft 2, a spool 3 and a drag mechanism 4. The spool shaft 2 is supported as a cantilever by the reel unit 1. The spool 3 is rotatably mounted to the spool shaft 2, and a fishing line can be wound about the outer periphery of the spool 3. The drag mechanism 4 brakes the spool 3 when the spool 3 is rotated in one direction.

Additionally, a support unit 5, having a tubular shape, is mounted between the spool shaft 2 and the inner peripheral part of the spool 3. A first restriction member 11 is disposed on the first side of the support unit 5, whereas a second restriction member 12 is disposed on the second side (opposite to the first side) of the support unit 5. Additionally, a seal mechanism 13 is provided for blocking intrusion of water and/or so forth into the interior of the support unit 5.

The reel unit 1 includes a side plate 15 having a disc shape on the first side. However, the reel unit 1 is opened on the second side. The side plate 15 is provided with an upper protection part 15a and a lower protection part 15b on an outer periphery of the side plate 15. The upper and lower protection parts 15a and 15b extend in an axial direction and are opposed to each other in an up-and-down direction. The upper protection part 15a is provided with an attachment part 15c for attaching the reel unit 1 to a fishing rod through the attachment part 15c. The side plate 15 is provided with a plurality of (herein, four) openings 15d aligned at intervals in a circumferential direction. The side plate 15 is provided with a shaft support part 15e on a center part of the side plate 15 so as to fix the spool shaft 2 to the side plate 15. The shaft support part 15e is an example of a shaft supporting means. The shaft support part 15e is provided with a female threaded part 15f in a center part of the shaft support part 15e.

The spool shaft 2 is provided with a first male threaded part 2a on a first end of the spool shaft 2. The spool shaft 2 is screwed and fixed to the center part of the side plate 15 by screwing the first male threaded part 2a into the female threaded part 15f of the shaft support part 15e. The spool shaft 2 is provided with a second male threaded part 2b and a third male threaded part 2c on a second end of the spool shaft 2. The diameter of the second male threaded part 2b is approximately equal to that of the middle part of the spool shaft 2. The third male threaded part 2c further protrudes from the second male threaded part 2b in the axial direction. The diameter of the third male threaded part 2c is smaller than that of the second male threaded part 2b.

The spool 3 is disposed in the interior of the reel unit 1. The spool 3 includes a bobbin trunk 3a, an inner flange 3b, an outer flange 3c, a boss 3d, and a coupling part 3e connecting the bobbin trunk 3a and the boss 3d. These constituent elements of the spool 3 are integrated. The bobbin trunk 3a, the inner flange 3b, the outer flange 3c and the coupling part 3e are provided with a plurality of through holes 3f for reducing the weight of the spool 3 and enhancing the aesthetic appearance of the reel unit 1. The through holes 3f are an example of a weight reducing means.

The bobbin trunk 3a has a cylindrical shape, and the fishing line is wound onto an outer peripheral surface of the bobbin trunk 3a. The inner flange 3b protrudes from the first end of the bobbin trunk 3a to the outer peripheral side. The inner flange 3b is disposed in opposition to the side plate 15 of the reel unit 1. The outer flange 3c protrudes from the second end of the bobbin trunk 3a to the outer peripheral side. The outer flange 3c is disposed in opposition to the inner flange 3b. The diameter of the outer flange 3c is larger than that of the inner flange 3b. The outer flange 3c is disposed to cover the opened part of the reel unit 1. A handle 16 is attached to the lateral surface of the outer flange 3c. The handle 16 is provided for enabling a rotational operation of the spool 3. The boss 3d is a tubular member provided with a through hole 3g extending in the axial direction. The boss 3d extends only to the first side from the inner peripheral end of the coupling part 3e.

The support unit 5 has a tubular shape and a center of the support unit 5 is penetrated by the spool shaft 2. The support unit 5 is accommodated in the inner peripheral part of the boss 3d. An axially extending lock protrusion (not shown in the drawings) is provided on the outer peripheral surface of the support unit 5. The axially extending lock protrusion is engaged with an axially extending lock groove (not shown in the drawings) provided on the inner peripheral surface of the boss 3d. With this construction, the support unit 5 is detachably (axially movably) attached to the boss 3d but is non-rotatable with respect to the boss 3d. Additionally, the support unit 5 is provided with a pair of male threaded parts 5a and 5b on both ends of an outer peripheral surface of the support unit 5.

Figure 3:
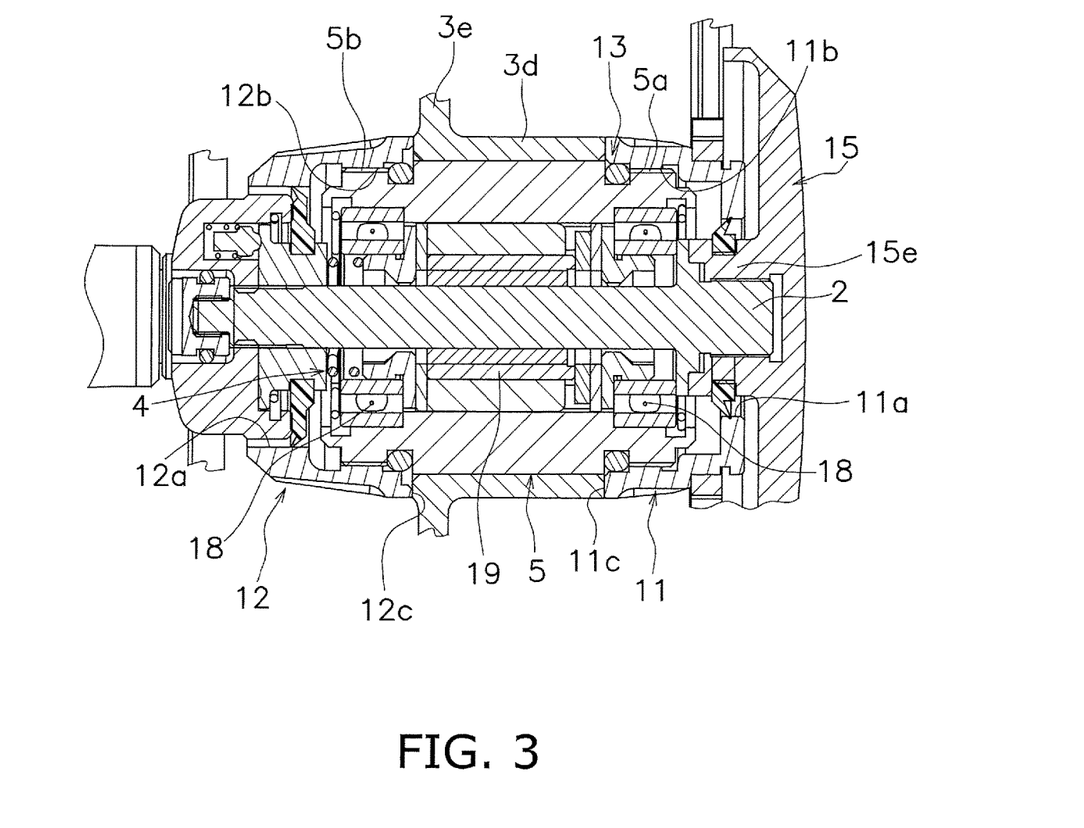
FIG. 3 is an enlarged partial view of FIG. 2.

As shown in an enlarged view of FIG. 3, the first restriction member 11 is disposed on the first side of the support unit 5, whereas the second restriction member 12 is disposed on the second side of the support unit 5. The first and second restriction members 11 and 12 are approximately cylindrical members, and are provided with circular openings 11a and 12a penetrated by the spool shaft 2, respectively. Additionally, parts (inner parts) of the first and second restriction members 11 and 12 are disposed on the outer peripheral side of the male threaded parts 5a and 5b of the support unit 5, respectively. These parts of the first and second restriction members 11 and 12 are provided with female threaded parts 11b and 12b on their inner peripheral surfaces, respectively. The female threaded parts 11b and 12b are engaged with the pair of male threaded parts 5a and 5b.

The first restriction member 11 makes contact at an end surface 11c (the second side one of the end surfaces of the first restriction member 11) with the tip of the boss 3d of the spool 3. The first restriction member 11 is an example of a first restricting means. On the other hand, the second restriction member 12 makes contact at an end surface 12c (the first side one of the end surfaces of the second restriction member 12) with the inner peripheral end of the coupling part 3e (the base end of the boss 3d) of the spool 3. The second restriction member 12 is an example of a second restricting means. Thus, the spool 3 is restricted from moving in the axial direction, while the boss 3d of the spool 3 is interposed between the first restriction member 11 and the second restriction member 12.

As shown in FIG. 3, the support unit 5 includes a pair of bearings 18 and a roller clutch 19 in an internal space of the support unit 5. The bearings 18 support the spool 3 such that the spool 3 is rotatable with respect to the spool shaft 2. The roller clutch 19 operates only when the spool 3 is rotated with respect to the spool shaft 2 in a fishing line releasing direction. The support unit 5 is an example of a spool supporting means.

Figure 4:
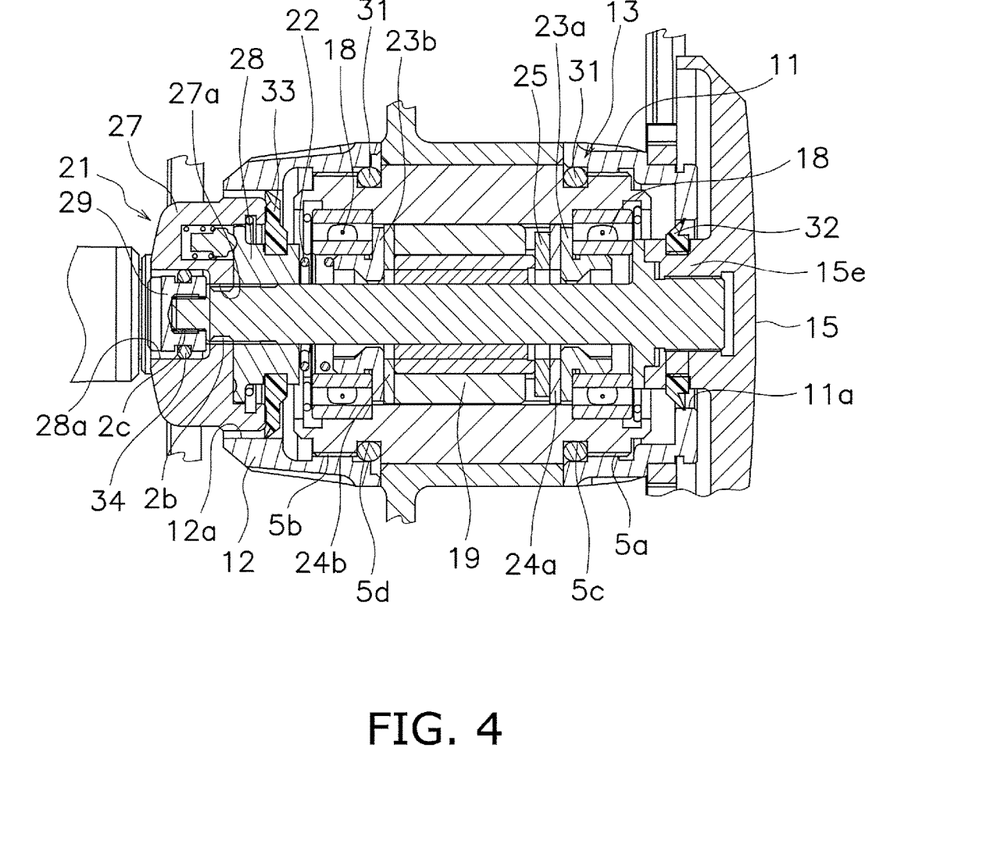
FIG. 4 is an enlarged partial view of FIG. 2.

The drag mechanism 4 will be explained with FIG. 4. The drag mechanism 4 includes a drag knob 21, a coil spring 22, a pair of bearing support members 23a and 23b, a pair of drag washers 24a and 24b, and a key washer 25.

The drag knob 21 includes a rotor 27 and a slider 28. The rotor 27 is provided with a female threaded part 27a in a center part of the rotor 27. The female threaded part 27a is screwed onto the second male threaded part 2b of the spool shaft 2. The slider 28 is provided with a through hole in a center part of the slider 28. The through hole is penetrated by the spool shaft 2. The slider 28 is mounted to the rotor 27 while being axially immovable and rotatable relatively to the rotor 27. Additionally, the slider 28 is axially movable along the outer peripheral surface of the spool shaft 2 in conjunction with rotation of the rotor 27.

It should be noted that the rotor 27 is provided with a recess 28a in a center part of the rotor 27 so as to dispose a fixation screw member 29 in the recess 28a. The fixation screw member 29 is screwed onto the third male threaded part 2c of the spool shaft 2. The fixation screw member 29 prevents the drag knob 21 from being detached from the spool shaft 2.

Each of the pair of bearing support members 23a and 23b includes a tubular part and a flange. The tubular part supports each bearing 18. The flange has a disc shape and extends from one end of the tubular part to the outer peripheral side. Additionally, the drag washer 24a and the key washer 25 are disposed between the roller clutch 19 and one of the bearing support members 23a and 23b (i.e., the bearing support member 23a). On the other hand, the drag washer 24b is disposed between the roller clutch 19 and the other of the bearing support members 23a and 23b (i.e., the bearing support member 23b). Moreover, the coil spring 22 is disposed between an end surface of the slider 28 of the drag knob 21 and an end surface of the tubular part of the bearing support member 23b.

With the aforementioned construction, a drag force is adjustable by axially moving the slider 28 in conjunction with rotation of the drag knob 21. The drag knob 21 is an example of a drag adjusting means.

Next, the seal mechanism 13 will be explained with FIG. 4. The seal mechanism 13 includes a pair of O-rings 31 (first seal member), a second seal member 32, a third seal member 33 and a fourth seal member 34. The seal members will be hereinafter explained in detail.

The support unit 5 is provided with annular grooves 5c and 5d on an outer peripheral surface of the support unit 5. Each annular groove 5c, 5d is located on the inner side of each male threaded part 5a, 5b. Additionally, the pair of O-rings 31 is disposed while being interposed between the annular grooves 5c and 5d and the inner peripheral surfaces of the first and second restriction members 11 and 12, respectively. With this construction, water and/or so forth are blocked from intruding into the support unit 5 through gaps between the inner peripheral parts of the first and second restriction members 11 and 12 and the outer peripheral part of the support unit 5. The pair of O-rings 31 is an example of a first sealing means.

The second seal member 32 is mounted to the outer peripheral surface of the shaft support part 15e of the side plate 15. The second seal member 32 seals between the opening 11a of the first restriction member 11 and the outer peripheral surface of the shaft support part 15e. Accordingly, water and/or so forth are blocked from intruding into the support unit 5 through the opening 11a of the first restriction member 11. The second seal member 32 is an example of a second sealing means.

The third seal member 33 is mounted to the outer peripheral surface of the slider 28 of the drag knob 21. The third seal member 33 seals between the opening 12a of the second restriction member 12 and the outer peripheral surface of the slider 28. Accordingly, water and/or so forth are blocked from intruding into the support unit 5 through the opening 12a of the second restriction member 12. The third seal member 33 is an example of a third sealing means.

The fourth seal member 34 is mounted to the outer peripheral surface of the fixation screw member 29. The fourth seal member 34 seals between the outer peripheral part of the fixation screw member 29 and the inner peripheral surface of the recess 28a provided on the rotor 27 of the drag knob 21. Accordingly, water and/or so forth are blocked from intruding into the support unit 5 from the inner peripheral part of the drag knob 21 through the outer peripheral surface of the spool shaft 2.

In the aforementioned single-bearing reel, when the fishing line is wound about the spool 3, the handle 16 is operated to rotate the spool 3. The spool 3 is rotated relatively to the spool shaft 2. At this time, the spool 3 is rotated in a fishing line winding direction by the roller clutch 19, and is therefore smoothly rotated.

When the fishing line is released from the spool 3, the spool 3 is rotated reversely to the fishing line winding direction. At this time, the roller clutch 19 is turned on. Hence, the drag mechanism 4 operates whereby rotation of the spool 3 is braked in accordance with an adjusted magnitude of drag force.

In the present preferred embodiment, the fishing line winding direction can be reversely changed by oppositely changing the attachment direction of the roller clutch 19, i.e., the attachment direction of the support unit 5. In this case, the second restriction member 12 is firstly detached, and then, the spool 3 is detached from the support unit 5. Next, the fixation screw member 29 is detached from the spool shaft 2, and the drag knob 21 is detached from the spool shaft 2. Subsequently, the support unit 5 is detached from the spool shaft 2, and then, the first restriction member 11 is detached from the support unit 5. The first and second restriction members 11 and 12 engage with the pair of the male threaded parts 5a and 5b of the support unit 5. Hence, the attachment direction of the support unit 5 is oppositely changed, and then, the first restriction member 11 is attached to the support unit 5. With this procedure, the attachment direction of the roller clutch 19 can be easily changed oppositely. The attachment procedure to be hereinafter performed is only different from the detachment procedure in that the steps of the attachment procedure are performed reversely to those of the detachment procedure. Hence, its explanation will not be hereinafter explained.

Second Preferred Embodiment

Figure 5:
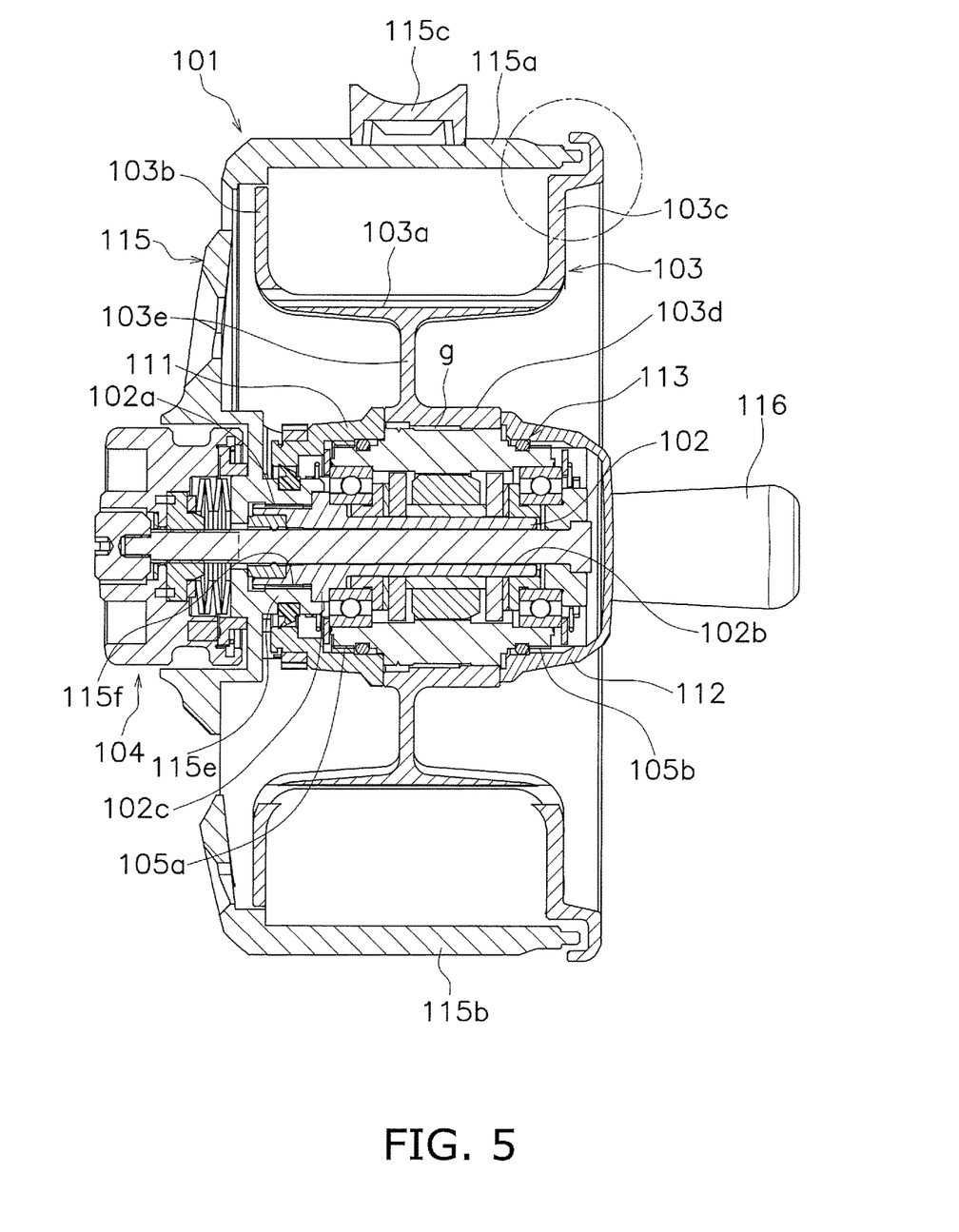
FIG. 5 is a diagram according to a second preferred embodiment of the present disclosure and corresponds to FIG. 2.

FIG. 5 is a cross-sectional view of a single-bearing reel employing a second preferred embodiment of the present disclosure. It should be noted that in the second preferred embodiment, the term "first side" refers to the left side in FIG. 5 whereas the term "second side" refers to the right side in FIG. 5. Thus, these term settings are reversed from those of the first preferred embodiment.

Similarly to the first preferred embodiment, the single-bearing reel includes a reel unit 101, a spool shaft 102, a spool 103 and a drag mechanism 104. The spool shaft 102 is supported as a cantilever by the reel unit 101. The spool 103 is rotatably mounted to the spool shaft 102 so as to wind a fishing line about an outer periphery of the spool 103. The drag mechanism 104 brakes the spool 103 when the spool 103 is rotated in one direction.

Additionally, a support unit 105, having a tubular shape, is mounted between the spool shaft 102 and the inner peripheral part of the spool 103. A first restriction member 111 is disposed on the first side of the support unit 105, whereas a second restriction member 112 is disposed on the second side (opposite to the first side) of the support unit 105. Additionally, a seal mechanism 113 is provided for blocking intrusion of water and/or so forth into the interior of the support unit 105.

Figure 6:
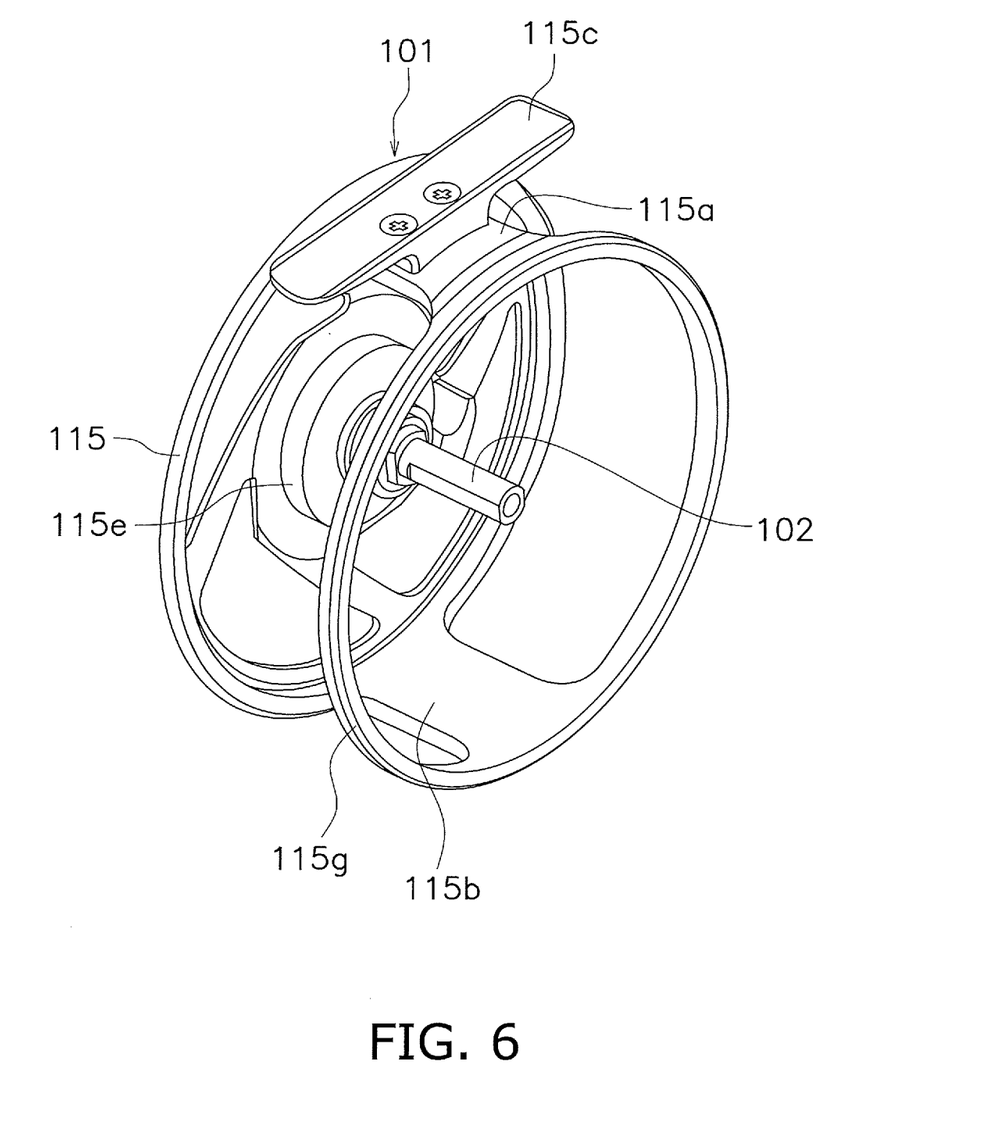
FIG. 6 is an external perspective view of a reel unit of a single-bearing reel according to the second preferred embodiment of the present disclosure.

The construction of the reel unit 101 is basically the same as that of the reel unit 1 of the first preferred embodiment. In other words, the reel unit 101 includes a side plate 115 having a disc shape on the first side. However, the reel unit 101 is opened on the second side. Additionally, the side plate 115 is provided with an upper protection part 115a and a lower protection part 115b on an outer periphery of the side plate 115. The upper protection part 115a is provided with an attachment part 115c. Moreover, the side plate 115 is provided with a shaft support part 115e on a center part of the side plate 115 so as to fix the spool shaft 102 to the side plate 115. The shaft support part 115e is another example of a shaft supporting means. The shaft support part 115e is provided with a female threaded part 115f in a center part of the shaft support part 115e. It should be noted that as is obvious from a perspective view of FIG. 6, unlike the reel unit 1 of the first preferred embodiment, the reel unit 101 of the second preferred embodiment is provided with an annular part 115g on a side facing the side plate 115. The annular part 115g and the outer peripheral part of the side plate 115 are connected through the upper protection part 115a and the lower protection part 115b.

The spool shaft 102 is provided with a male threaded part 102a on a first end of the spool shaft 102. The spool shaft 102 is screwed and fixed to the center part of the side plate 115 by screwing the first male threaded part 102a into the female threaded part 115f of the shaft support part 115e. The spool shaft 102 is provided with a through hole 102b in a center part of the spool shaft 102. The through hole 102b penetrates the spool shaft 102 in the axial direction. It should be noted that an annular brim 102c is provided on a part of the spool shaft 102. The annular brim 102c contacts the tip end of the shaft support part 115e of the reel unit 101.

The spool 103 is disposed in the interior of the reel unit 101. The construction of the spool 103 is similar to that of the spool 3 of the first preferred embodiment. In other words, the spool 103 includes a bobbin trunk 103a, an inner flange 103b, an outer flange 103c, a boss 103d and a coupling part 103e. Additionally, a handle 116 is attached to the lateral surface of the outer flange 103c.

It should be noted that in the present preferred embodiment, only part of the inner peripheral surface of the boss 103d contacts the outer peripheral surface of the support unit 105, whereas a gap g is produced between the other part of the inner peripheral surface of the boss 103d and the outer peripheral surface of the support unit 105. This construction is made for easily detaching the spool 103 from the support unit 105.

Figure 7:
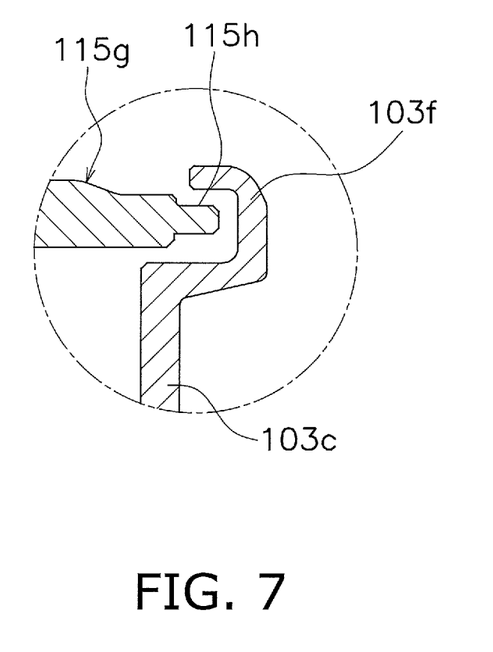
FIG. 7 is an enlarged partial view of FIG. 5.

FIG. 7 shows an enlarged view of the annular part 115g of the reel unit 101 and the outer peripheral part of the spool 103. A tip end 115h of the annular part 115g has a radial thickness thinner than that of the other part of the annular part 115g. On the other hand, the outer flange 103c of the spool 103 is provided with a groove part 103f protruding from an outer peripheral part to the further outer peripheral side of the outer flange 103c. The groove part 103f has a cross-section made in the shape of a square C opened to the first side. Additionally, the tip end 115h of the annular part 115g of the reel unit 101 is inserted into the groove part 103f.

With the aforementioned construction, the tip end 115h inserted into the groove part 103f is unlikely to make contact with the groove part 103f. This can be specifically expressed as follows. When a thumbing operation is performed or when the tension of the fishing line is large, the spool 103 is likely to tilt. However, even when the spool 103 tilts, the spool 3 and the reel unit 101 are unlikely to contact each other.

Similarly to the support unit 5 according to the first preferred embodiment, the support unit 105 has a tubular shape, and is accommodated in the inner peripheral part of the boss 103d while being penetrated by the spool shaft 2. The support unit 105 is detachably (axially movably) attached to the boss 103d but is non-rotatable with respect to the boss 103d. Additionally, the support unit 105 is provided with a pair of male threaded parts 105a and 105b on both ends of an outer peripheral surface of the support unit 105.

Figure 8:
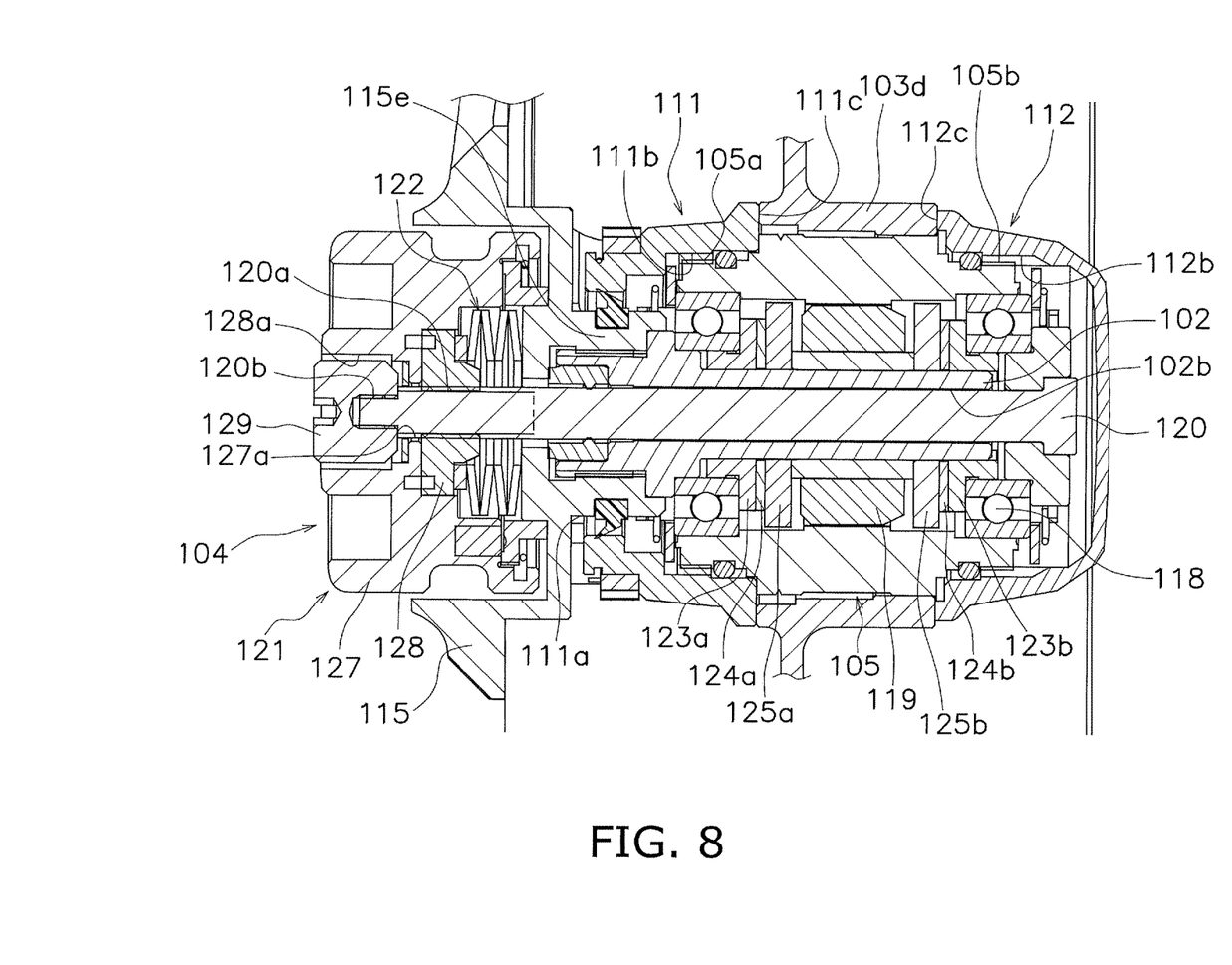
FIG. 8 is an enlarged partial view of FIG. 5.

As shown in an enlarged view of FIG. 8, the first restriction member 111 is an approximately cylindrical member, and is provided with a circular opening 111a in a center part of the first restriction member 111. Additionally, a part (inner part) of the first restriction member 111 is disposed on the outer peripheral side of the male threaded part 105a of the support unit 105. This part of the first restriction member 111 is provided with a female threaded part 111b on an inner peripheral surface of the first restriction member 111. The female threaded part 111b is engaged with the male threaded part 105a. The first restriction member 111 is another example of the first restricting means.

The second restriction member 112 is a member made in the shape of a closed-end cylinder, i.e., a cap. A part (inner part) of the second restriction member 112 is disposed on the outer peripheral side of the male threaded part 105b of the support unit 105. This part of the second restriction member 112 is provided with a female threaded part 112b on an inner peripheral surface of the second restriction member 112. The female threaded part 112b is engaged with the male threaded part 105b. The second restriction member 112 is another example of a second restricting means.

Similarly to the first preferred embodiment, the spool 103 is restricted from moving in the axial direction, while the boss 103d is interposed between an end surface 111c (second side end surface) of the first restriction member 111 and an end surface 112c (first side end surface) of the second restriction member 112.

Additionally, a pair of bearings 118 and a roller clutch 119 are disposed in the internal space of the support unit 105. This construction is similar to that of the first preferred embodiment. The support unit 105 is another example of a spool supporting means.

The drag mechanism 104 includes a drag shaft 120, a drag knob 121, disc springs 122, a pair of bearing support members 123a and 123b, a pair of drag washers 124a and 124b, and a pair of key washers 125a and 125b.

The drag shaft 120 is non-rotatably mounted to the spool shaft 102 while penetrating the shaft support part 115e and the through hole 102b of the spool shaft 102. The drag shaft 120 is provided with a first male threaded part 120a on a first side end of the drag shaft 120. The drag shaft 120 is further provided with a second male threaded part 120b on the tip end of the first male threaded part 120a. The second male threaded part 120b has a smaller diameter than the first male threaded part 120a.

The drag knob 121 includes a rotor 127 and a slider 128. The rotor 127 is provided with a female threaded part 127a in a center part of the rotor 127. The female threaded part 127a is engaged with the first male threaded part 120a of the drag shaft 120. The slider 128 is provided with a through hole in a center part of the slider 128. The through hole is penetrated by the drag shaft 120. The slider 128 is mounted to the rotor 127 while being axially immovable and rotatable relatively to the rotor 127. Additionally, the slider 128 is axially movable along the outer peripheral surface of the drag shaft 120 in conjunction with rotation of the rotor 127.

It should be noted that the rotor 127 is provided with a recess 128a in a center part of the rotor 127 so as to dispose a fixation screw member 129 in the recess 128a. The fixation screw member 129 is screwed onto the second male threaded part 120b of the drag shaft 120. The fixation screw member 129 prevents the drag knob 121 from being detached from the drag shaft 120.

Each of the pair of bearing support members 123a and 123b includes a tubular part and a flange. The tubular part supports each bearing 118. The flange has a disc shape and extends from one end of the tubular part to the outer peripheral side. Additionally, the drag washer 124a and a key washer 125a are disposed between the roller clutch 119 and one of the bearing support members 123a and 123b (i.e., the bearing support member 123a). On the other hand, the drag washer 124b and a key washer 125b are disposed between the roller clutch 119 and the other of the bearing support members 123a and 123b (i.e., the bearing support member 123b). Moreover, the disc springs 122 are disposed between the slider 128 of the drag knob 121 and the shaft support part 115e of the side plate 115.

With the aforementioned construction, a drag force is adjustable by axially moving the slider 128 in conjunction with rotation of the drag knob 121. The drag knob 121 is another example of a drag adjusting means.

Figure 9:
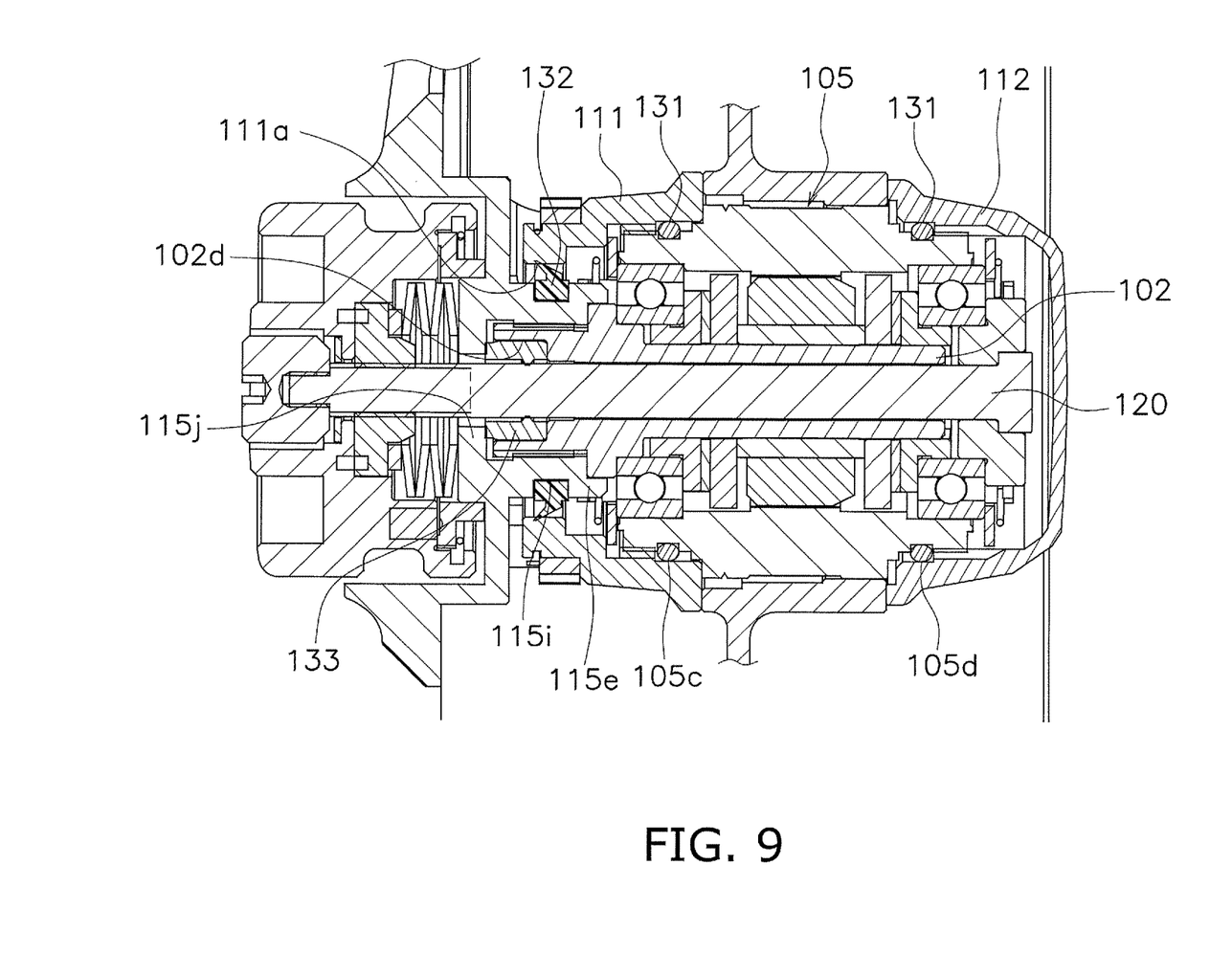
FIG. 9 is an enlarged partial view of FIG. 5.

Next, the seal mechanism 113 will be explained with FIG. 9. The seal mechanism 113 includes a pair of O-rings 131 (first seal member), a second seal member 132 and a third seal member 133. The seal members will be hereinafter explained in detail.

The construction of the pair of O-rings 131 is similar to that of the pair of O-rings 31 in the first preferred embodiment. Specifically, the support unit 105 is provided with annular grooves 105c and 105d on an outer peripheral surface of the support unit 105, and the pair of O-rings 131 is disposed while being interposed between the annular grooves 105c and 105d and the inner peripheral surfaces of the first and second restriction members 111 and 112, respectively. With this construction, water and/or so forth are blocked from intruding into the support unit 105 through gaps between the inner peripheral parts of the first and second restriction members 111 and 112 and the outer peripheral part of the support unit 105. The pair of O-rings 131 is another example of the first sealing means.

The second seal member 132 is mounted to the outer peripheral surface of the shaft support part 115e of the side plate 115. In other words, the shaft support part 115e is provided with an annular groove 115i on an outer peripheral surface of the shaft support part 115e. The second seal member 132 is mounted to the annular groove 115i. The second seal member 132 seals between the shaft support part 115e and the opening 111a of the first restriction member 111. Accordingly, water and/or so forth are blocked from intruding into the support unit 105 through the opening 111a of the first restriction member 111. The second seal member 132 is another example of a second sealing means.

The third seal member 133 is mounted to the first side end of the spool shaft 102. In more detail, the spool shaft 102 is provided with a recess 102d on a first side end of the spool shaft 102. The recess 102d is annularly recessed into the spool shaft 102. The third seal member 133 is mounted to the recess 102d. The inner peripheral part of the third seal member 133 contacts the outer peripheral surface of the drag shaft 120. Additionally, the third seal member 133 is disposed while partially protruding from the recess 102d. Moreover, the end surface of the protruding part of the third seal member 133 contacts a brim 115j provided on the inner peripheral part of the shaft support part 115e. Accordingly, water and/or so forth are blocked from intruding into the support unit 105 through a gap between the spool shaft 102 and the drag shaft 120. The third seal member 133 is another example of a third sealing means.

A fishing line winding action and a fishing line releasing action of the single-bearing reel according to the second preferred embodiment are similar to those of the single-bearing reel according to the first preferred embodiment, and will not be hereinafter explained.

Similarly to the first preferred embodiment, the first and second restriction members 111 and 112 engage with both ends of the male threaded parts 105a and 105b of the support unit 105 in the second preferred embodiment. Hence, the fishing line winding direction can be herein reversely changed by oppositely changing the attachment direction of the roller clutch 119, i.e., the attachment direction of the support unit 105.

When described in detail, the second restriction member 112 is firstly detached, and then, the spool 103 is detached from the support unit 105. Next, the fixation screw member 129 and the drag knob 121 are detached, and the drag shaft 120 is pulled out. Then, the support unit 105 is detached from the spool shaft 102. Next, the first restriction member 111 is detached, and the attachment direction of the support unit 105 is reversely changed. Then, the first restriction member 111 is attached. The attachment procedure to be hereinafter performed is only different from the detachment procedure in that the steps of the attachment procedure are performed reversely to those of the detachment procedure. Hence, its explanation will not be hereinafter explained.

Other Preferred Embodiments

The present disclosure is not limited to the aforementioned preferred embodiments, and a variety of changes or modifications can be made without departing from the scope of the present disclosure.

What is claimed is:
1. A single-bearing reel, comprising:
a reel unit including a shaft support part;
a spool shaft supported as a cantilever by the shaft support part;
a support unit having a tubular shape, the support unit rotatable with respect to the spool shaft;
a spool mounted to the support unit, the spool rotatable with respect to the spool shaft, a fishing line to be wound about an outer periphery of the spool;
a first restriction member having an annular shape, the spool shaft penetrating through the first restriction member, the first restriction member at least partially mounted to an outer peripheral part of the support unit on a first end side of the support unit, the first restriction member restricting the spool from moving in an axial direction;
a second restriction member having an annular shape, the spool shaft penetrating through the second restriction member, the second restriction member at least partially mounted to the outer peripheral part of the support unit on a second end side of the support unit, the second restriction member restricting the spool from moving in the axial direction;
a pair of first seal members disposed on an outer peripheral surface of the support unit, one of the pair of first seal members sealing between the support unit and the first restriction member, the other of the pair of first seal members sealing between the support unit and the second restriction member;
a second seal member sealing an inner peripheral part of the support unit from an inner peripheral part of the first restriction member; and
a third seal member sealing the inner peripheral part of the support unit from an inner peripheral part of the second restriction member.

2. The single-bearing reel according to claim 1, further comprising:
a drag mechanism including a drag knob for adjusting a drag force, the drag knob disposed on an inner peripheral side of the second restriction member, wherein
the third seal member seals between the inner peripheral part of the second restriction member and an outer peripheral part of the drag knob.

3. The single-bearing reel according to claim 1, wherein the second seal member seals between the inner peripheral part of the first restriction member and an outer peripheral part of the shaft support part.

4. The single-bearing reel according to claim 1, wherein the spool includes a boss having a tubular shape,
the support unit is disposed inside of the boss, and
the boss is interposed between the first restriction member and the second restriction member and is restricted from moving in the axial direction by the first restriction member and the second restriction member.

5. The single-bearing reel according to claim 1, wherein the pair of first seal members is a pair of O-rings.

6. The single-bearing reel according to claim 1, wherein the support unit includes a pair of bearings and a roller clutch, and the pair of bearings support the spool, the roller clutch disposed between the pair of bearings, the roller clutch configured to transmit or block a rotation of the spool along a rotational direction of the spool.

7. The single-bearing reel according to claim 1, wherein the spool includes a plurality of through holes.

8. The single-bearing reel according to claim 1, further comprising:
a rotor including a recess;
a fixation screw disposed in the recess and on an axial end of the spool shaft; and
a fourth seal member sealing between the rotor and the fixation screw.

9. A single-bearing reel, comprising:
a reel unit including a shaft support part;
a spool shaft supported as a cantilever by the shaft support part;
a support unit having a tubular shape, the support unit rotatable with respect to the spool shaft;
a spool mounted to the support unit, the spool rotatable with respect to the spool shaft a fishing line to be wound about an outer periphery of the spool;
a drag shaft penetrating an interior of the shaft support part and an interior of the spool shaft;
a first restriction member having an annular shape, the spool shaft penetrating through the first restriction member, the first restriction member at least partially mounted to an outer peripheral part of the support unit on a first end side of the support unit, the first restriction member restricting the spool from moving in an axial direction;

a second restriction member having a closed-end cylindrical shape, the second restriction member at least partially mounted to the outer peripheral part of the support unit on a second end side of the support unit, the second restriction member restricting the spool from moving in the axial direction;

a pair of first seal members disposed on an outer peripheral surface of the support unit, one of the pair of first seal members sealing between the support unit and the first restriction member, the other of the pair of first seal members sealing between the support unit and the second restriction member;

a second seal member sealing an inner peripheral part of the support unit from an inner peripheral part of the first restriction member; and a third seal member sealing between an inner peripheral part of the spool shaft and an outer peripheral part of the drag shaft.

10. The single-bearing reel according to claim 9, wherein the second seal member seals between the inner peripheral part of the first restriction member and an outer peripheral part of the shaft support part.

11. The single-bearing reel according to claim 9, wherein the spool includes a boss having a tubular shape, the support unit is disposed inside of the boss, and the boss is interposed between the first restriction member and the second restriction member and is restricted from moving in the axial direction by the first restriction member and the second restriction member.

12. The single-bearing reel according to claim 9, wherein the pair of first seal members is a pair of O-rings.

13. The single-bearing reel according to claim 9, wherein the support unit includes a pair of bearings and a roller clutch, the pair of bearings supports the spool, the roller clutch disposed between the pair of bearings, the roller clutch configured to transmit or block a rotation of the spool along a rotational direction of the spool.

14. The single-bearing reel according to claim 9, wherein the spool includes a plurality of through holes.

15. A single-bearing reel, comprising:

a spool shaft;

a reel unit including shaft supporting means for supporting the spool shaft;

a spool;

spool supporting means for rotatably supporting the spool with respect to the spool shaft;

first restricting means for restricting the spool from moving in an axial direction;

second restricting means for restricting the spool from moving in the axial direction;

first sealing means for sealing between the spool supporting means and the second restricting means;

second sealing means for sealing an inner peripheral part of the spool supporting means from an inner peripheral part of the first restricting means;

third sealing means for sealing the inner peripheral part of the spool supporting means from an inner peripheral part of the second restricting means; and drag adjusting means for adjusting a drag force, the third sealing means sealing between the inner peripheral part of the second restricting means and an outer peripheral part of the drag adjusting means.

16. The single-bearing reel according to claim 15, wherein the spool includes a boss having a tubular shape, the spool supporting means is disposed inside of the boss, and the boss is interposed between the first restricting means and the second restricting means and is restricted from moving in the axial direction by the first restricting means and the second restricting means.

* * * * *